(12) United States Patent
Manthiram et al.

(10) Patent No.: US 8,974,960 B2
(45) Date of Patent: Mar. 10, 2015

(54) BINDER-FREE SULFUR—CARBON NANOTUBE COMPOSITE CATHODES FOR RECHARGEABLE LITHIUM—SULFUR BATTERIES AND METHODS OF MAKING THE SAME

(75) Inventors: Arumugam Manthiram, Austin, TX (US); Yu-Sheng Su, Austin, TX (US)

(73) Assignee: Board of Regents, The University of Texas System, Austin, TX (US)

(*) Notice: Subject to any disclaimer, the term of this patent is extended or adjusted under 35 U.S.C. 154(b) by 155 days.

(21) Appl. No.: 13/335,514

(22) Filed: Dec. 22, 2011

(65) Prior Publication Data

US 2013/0164626 A1    Jun. 27, 2013

(51) Int. Cl.
 H01M 4/58 (2010.01)
 H01M 4/62 (2006.01)
 H01M 10/052 (2010.01)
 B82B 3/00 (2006.01)
 B82Y 30/00 (2011.01)
 H01M 4/1397 (2010.01)

(52) U.S. Cl.
 CPC ........... *H01M 4/58* (2013.01); *H01M 4/625* (2013.01); *B82B 3/00* (2013.01); *H01M 10/052* (2013.01); *B82Y 30/00* (2013.01); *H01M 4/1397* (2013.01); *Y10S 977/742* (2013.01); *Y10S 977/948* (2013.01)
 USPC ........ 429/218.1; 429/232; 977/742; 977/948; 252/182.1; 252/500

(58) Field of Classification Search
 USPC ................. 429/231.8; 428/221; 977/742, 948
 See application file for complete search history.

(56) References Cited

U.S. PATENT DOCUMENTS

| 3,532,543 A | 10/1970 | Nole et al. ........................ 136/6 |
| 4,885,217 A * | 12/1989 | Hoge .............................. 429/407 |
| 5,582,623 A | 12/1996 | Chu .............................. 29/623.1 |
| 6,194,099 B1 * | 2/2001 | Gernov et al. ................. 429/213 |
| 6,200,704 B1 | 3/2001 | Katz et al. .................. 429/218.1 |

(Continued)

FOREIGN PATENT DOCUMENTS

| JP | 2010202455 | 9/2010 | ............ H01M 4/587 |
| KR | 20030081778 A | * 10/2003 | |

(Continued)

OTHER PUBLICATIONS

Guo et al. "Sulfur-Impregnated Disordered Carbon Nanotubes Cathode for Lithium—Sulfur Batteries", Nano Lett. 2011, 11, pp. 4288-4294 (published Sep. 19, 2011).*

(Continued)

*Primary Examiner* — Gregg Cantelmo
(74) *Attorney, Agent, or Firm* — Baker Botts L.L.P.

(57) ABSTRACT

The present disclosure includes a sulfur-carbon nanotube composite comprising a sheet of carbon nanotubes and sulfur nucleated upon the carbon nanotubes, and methods for synthesizing the same. In some embodiments, the sulfur-carbon composite may further be binder-free and include a sheet of carbon nanotubes, rendering a binder and a current collector unnecessary. In other embodiments of the present disclosure, a cathode comprising the sulfur-carbon nanotube composite is disclosed. In additional embodiments of the present disclosure, batteries may include the cathodes described herein. Those batteries may achieve high rate capabilities.

11 Claims, 6 Drawing Sheets
(2 of 6 Drawing Sheet(s) Filed in Color)

(56) References Cited

U.S. PATENT DOCUMENTS

| | | | |
|---|---|---|---|
| 6,344,293 | B1 | 2/2002 | Geronov ............... 429/218.1 |
| 7,939,198 | B2 | 5/2011 | Mukherjee et al. ....... 429/218.1 |
| 2003/0113624 | A1 | 6/2003 | Kim et al. |
| 2004/0058246 | A1 | 3/2004 | Choi et al. |
| 2005/0238956 | A1* | 10/2005 | Lee ........................ 429/211 |
| 2007/0072076 | A1* | 3/2007 | Kolosnitsyn et al. ...... 429/218.1 |
| 2007/0287060 | A1 | 12/2007 | Naoi et al. |
| 2009/0226809 | A1 | 9/2009 | Vu et al. ................. 429/220 |
| 2010/0239914 | A1 | 9/2010 | Mikhaylik et al. ........ 429/231.8 |
| 2011/0052998 | A1 | 3/2011 | Liang et al. ............. 429/300 |
| 2011/0111279 | A1* | 5/2011 | Smithyman et al. ........ 429/122 |
| 2011/0262807 | A1* | 10/2011 | Boren et al. .............. 429/211 |

FOREIGN PATENT DOCUMENTS

| | | | |
|---|---|---|---|
| KR | 10-0463437 B1 | 12/2004 | |
| KR | 1020030081778 B1 | 12/2004 | |
| KR | 10-0484642 | 4/2005 | ............ H01M 4/60 |

OTHER PUBLICATIONS

Elazari et al. "Sulfur-Impregnated Activated Carbon Fiber Closth as a Binder-Free Cathode for Rechargeable Li—S Batteries", Adv. Mater. 2011, 23, pp. 5641-5644.*

Han et al. "Effect of multiwalled carbon nanotubes on electrochemical properties of lithium sulfur rechargeable batteries"; J. Electrochem. Soc. 2003; 150(7); A889-A893.

Zheng et al.; "Novel nanosized absorbing sulfur composite cathode materials for the advanced secondary lithium batteries"; Electrochim. Acta 2006; 51(7); 1330-1335.

Yuan et al.; "Improvement of cycle property of sulfur-coated multi-walled carbon nanotubes composite cathode for lithium/sulfur batteries"; J. Power Sources 2009; 189(2); 1141-1146.

Chen et al.; "The preparation of nano-sulfur/MWCNTs and its electrochemical performance"; Electrochim. Acta 2010; 55(27); 8062-8066.

Wei et al.; "CNT enhanced sulfur composite cathode material for high rate lithium battery"; Electrochem. Commun. 2011; 13(5); 399-402.

Cheon et al.; "Rechargeable lithium sulfur battery—I. Structural change of sulfur cathode during discharge and charge"; J. Electrochem. Soc. 2003; 150(6); A796-A799.

Cheon et al.; "Rechargeable lithium sulfur battery—II. Rate capability and cycle characteristics"; J. Electrochem. Soc. 2003; 150(6); A800-A805.

Cheon et al.; "Capacity fading mechanisms on cycling a high-capacity secondary sulfur cathode"; J. Electrochem. Soc. 2004; 151(12); A2067-A2073.

Ng et al.; "Single wall carbon nanotube paper as anode for lithium-ion battery"; Electrochim. Acta 2005; 51(1); 23-28.

Chew et al.; "Flexible free-standing carbon nanotube films for model lithium-ion batteries"; carbon 2009; 47(13); 2976-2983.

Ban et al.; "Nanostructures Fe(3)O(4)/SWNT Electrode: Binder-free and high-rate Li-Ion Anode"; Adv. Mater. 2010; 22(20); E145-+.

International Search Report and Written Opinion; PCT/US2012/071206; pp. 12.

International Preliminary Report on Patentability for PCT US2012/071206 filed Dec. 21, 2012, mailing date Jul. 3, 2014; 10 pages.

* cited by examiner

BINDER-FREE SULFUR—CARBON NANOTUBE COMPOSITE CATHODES FOR RECHARGEABLE LITHIUM—SULFUR BATTERIES AND METHODS OF MAKING THE SAME

TECHNICAL FIELD

The current disclosure relates to a binder-free sulfur-carbon nanotube (S—CNT) composite usable as a cathode in batteries, particularly lithium-sulfur secondary (rechargeable) batteries and to methods of making such a composite. The disclosure also relates to cathodes and batteries containing such composites.

BACKGROUND

Basic Principles of Batteries and Electrochemical Cells

Batteries may be divided into two principal types, primary batteries and secondary batteries. Primary batteries may be used once and are then exhausted. Secondary batteries are also often called rechargeable batteries because after use they may be connected to an electricity supply, such as a wall socket, and recharged and used again. In secondary batteries, each charge/discharge process is called a cycle. Secondary batteries eventually reach an end of their usable life, but typically only after many charge/discharge cycles.

Secondary batteries are made up of an electrochemical cell and optionally other materials, such as a casing to protect the cell and wires or other connectors to allow the battery to interface with the outside world. An electrochemical cell includes two electrodes, the positive electrode or cathode and the negative electrode or anode, an insulator separating the electrodes so the battery does not short out, and an electrolyte that chemically connects the electrodes.

In operation the secondary battery exchanges chemical energy and electrical energy. During discharge of the battery, electrons, which have a negative charge, leave the anode and travel through outside electrical conductors, such as wires in a cell phone or computer, to the cathode. In the process of traveling through these outside electrical conductors, the electrons generate an electrical current, which provides electrical energy.

At the same time, in order to keep the electrical charge of the anode and cathode neutral, an ion having a positive charge leaves the anode and enters the electrolyte and a positive ion also leaves the electrolyte and enters the cathode. In order for this ion movement to work, typically the same type of ion leaves the anode and joins the cathode. Additionally, the electrolyte typically also contains this same type of ion. In order to recharge the battery, the same process happens in reverse. By supplying energy to the cell, electrons are induced to leave the cathode and join the anode. At the same time a positive ion, such as $Li^+$, leaves the cathode and enters the electrolyte and a $Li^+$ leaves the electrolyte and joins the anode to keep the overall electrode charge neutral.

In addition to containing an active material that exchanges electrons and ions, anodes and cathodes often contain other materials, such as a metal backing to which a slurry is applied and dried. The slurry often contains the active material as well as a binder to help it adhere to the backing and conductive materials, such as a carbon particles. Once the slurry dries it forms a coating on the metal backing.

Unless additional materials are specified, batteries as described herein include systems that are merely be electrochemical cells as well as more complex systems.

Several important criteria for rechargeable batteries include energy density, power density, rate capability, cycle life, cost, and safety. The current lithium-ion battery technology based on insertion compound cathodes and anodes is limited in energy density. This technology also suffers from safety concerns arising from the chemical instability of oxide cathodes under conditions of overcharge and frequently requires the use of expensive transition metals. Accordingly, there is immense interest to develop alternate cathode materials for lithium-ion batteries. Sulfur has been considered as one such alternative cathode material.

Lithium-Sulfur Batteries

Lithium-sulfur (Li—S) batteries are a particular type of rechargeable battery. Unlike most rechargeable batteries in which the ion actually moves into and out of a crystal lattice, the ion on lithium sulfur batteries reacts with lithium in the anode and with sulfur in the cathode even in the absence of a precise crystal structure. In most Li—S batteries the anode is lithium metal (Li or $Li^0$). In operation lithium leaves the metal as lithium ions ($Li^+$) and enters the electrolyte when the battery is discharging. When the battery is recharged, lithium ions ($Li^+$) leave the electrolyte and plate out on the lithium metal anode as lithium metal (Li). At the cathode, during discharge, particles of elemental sulfur (S) react with the lithium ion ($Li^+$) in the electrolyte to form $Li_2S$. When the battery is recharged, lithium ions ($Li^+$) leave the cathode, allowing to revert to elemental sulfur (S).

Sulfur is an attractive cathode candidate as compared to traditional lithium-ion battery cathodes because it offers an order of magnitude higher theoretical capacity (1675 mAh $g^{-1}$) than the currently employed cathodes (<200 mAh $g^{-1}$) and operates at a safer voltage range (1.5-2.5 V). In addition, sulfur is inexpensive and environmentally benign.

However, the major problem with a sulfur cathode is its poor cycle life. The discharge of sulfur cathodes involves the formation of intermediate polysulfide ions, which dissolve easily in the electrolyte during the charge-discharge process and result in an irreversible loss of active material during cycling. The higher-order polysulfides ($Li_2S_n^{2-}$, $4 \leq n \leq 8$) produced during the initial stage of the discharge process are soluble in the electrolyte and move toward the lithium metal anode, where they are reduced to lower-order polysulfides. Moreover, solubility of these high-order polysulfides in the liquid electrolytes and nucleation of the insoluble low-order sulfides (i.e., $Li_2S_2$ and $Li_2S$) result in poor capacity retention and low Coulombic efficiency. In addition, shuttling of these high-order polysulfides between the cathode and anode during charging, which involves parasitic reactions with the lithium anode and re-oxidation at the cathode, is another challenge. This process results in irreversible capacity loss and causes the build-up of a thick irreversible $Li_2S$ barrier on the electrodes during prolonged cycling, which is electrochemically inaccessible.[7,8] Overall, the operation of Li—S cells is so dynamic that novel electrodes with optimized compositions and structure are needed to maintain the high capacity of sulfur and overcome the challenges associated with the solubility and shuttling of polysulfides.

Moreover, sulfur is an insulator with a resistivity of $5 \times 10^{-30}$ S $cm^{-1}$ at 25° C.,[11] resulting in a poor electrochemical utilization of the active material and poor rate capacity. Although the addition of conductive carbon to the sulfur material could improve the overall electrode conductivity, the core of the sulfur particles, which have little or no contact with conductive carbon, will still be highly resistive.

Various sulfur-carbon composites have been designed in recent years to overcome these difficulties. Conductive carbon materials, especially carbon with porous structure, might not only improve the electrical conductivity but also trap part of the soluble polysulfides during cycling. However, most of the previously reported composites have only shown marginal improvements in rate capability (<C/2) and cyclability.

Therefore, there remains a need for an additional sulfur-carbon composites.

SUMMARY

Accordingly, certain embodiments of the disclosure described in this disclosure present sulfur-carbon composite that achieves high rate capabilities. The sulfur-carbon composite may further be binder-free and include a sheet of carbon nanotubes, rendering a binder and a current collector unnecessary.

One embodiment of the disclosure presents a method of forming a sulfur-carbon nanotube composite. This method may comprise forming an aqueous solution of a sulfur-based ion and carbon nanotubes, adding an acid to the aqueous solution such that the sulfur-based ion nucleates as sulfur upon the surface of the carbon nanotubes, and forming the carbon nanotubes with the sulfur nucleated thereon into a sheet. In such a method, the sulfur-carbon nanotube composite includes the sheet of carbon nanotubes with sulfur nucleated thereon.

Another embodiment of the disclosure includes a sulfur-carbon nanotube composite. This composite comprises a sheet of carbon nanotubes, the carbon nanotubes having characteristics to encourage the formation of the carbon nanotubes into the sheet. The composite further comprises sulfur nucleated upon the carbon nanotubes and configured to reversibly react with an alkali metal to form polysulfides.

An alternative embodiment of the present disclosure presents a cathode. The cathode comprises a sheet of carbon nanotubes, the carbon nanotubes having characteristics to encourage the formation of the carbon nanotubes into the sheet. The cathode further comprises sulfur nucleated upon the carbon nanotubes and configured to reversibly react with an alkali metal to form polysulfides.

An additional embodiment of the present disclosure includes a battery. The battery comprises a cathode comprising a sheet of carbon nanotubes, the carbon nanotubes having characteristics to encourage the formation of the carbon nanotubes into the sheet and sulfur nucleated upon the carbon nanotubes and configured to reversibly react with an alkali metal to form polysulfides. The battery further comprises an anode comprising an alkali metal and an electrolyte.

The following abbreviations are commonly used throughout the specification:
$Li^+$—lithium ion
$Li^0$—elemental or metallic lithium or lithium metal
S—sulfur
Li—S—lithium-sulfur
$Li_2S$—lithium sulfide
S—C—sulfur-carbon
MWCNT—multi-wall carbon nanotubes
CNT—carbon nanotube
S—CNT—sulfur-carbon nanotube
S45-CNT—sulfur-carbon nanotube with 45 weight % sulfur
S60-CNT—sulfur-carbon nanotube with 60 weight % sulfur
$Na_2S_2O_3$—sodium thiosulfate
$K_2S_2O_3$—potassium thiosulfate
$M_xS_2O_3$—metal thiosulfate
$H^+$—hydrogen ion
HCl—hydrochloric acid
$C_3H_8O$—isopropyl alcohol
DI—deionized
PVDF—polyvinylidene fluoride
NMP—N-methylpyrrolidinone
DME—1,2-dimethoxyethane
DOL—1,3-dioxolane
TGA—thermogravimetric analysis
SEM—scanning electron microscope
STEM—scanning transmission electron microscopy
XRD—X-ray diffraction
TEM—transmission electron microscope
CV—cyclic voltammetry

BRIEF DESCRIPTION OF THE DRAWINGS

A more complete understanding of the present embodiments and advantages thereof may be acquired by referring to the following description taken in conjunction with the accompanying drawings, which relate to embodiments of the present disclosure. The patent or application file contains at least one drawing executed in color. Copies of this patent or patent application publication with color drawings with be provided by the Office upon request and payment of the necessary fee.

DETAILED DESCRIPTION

Figure 1:
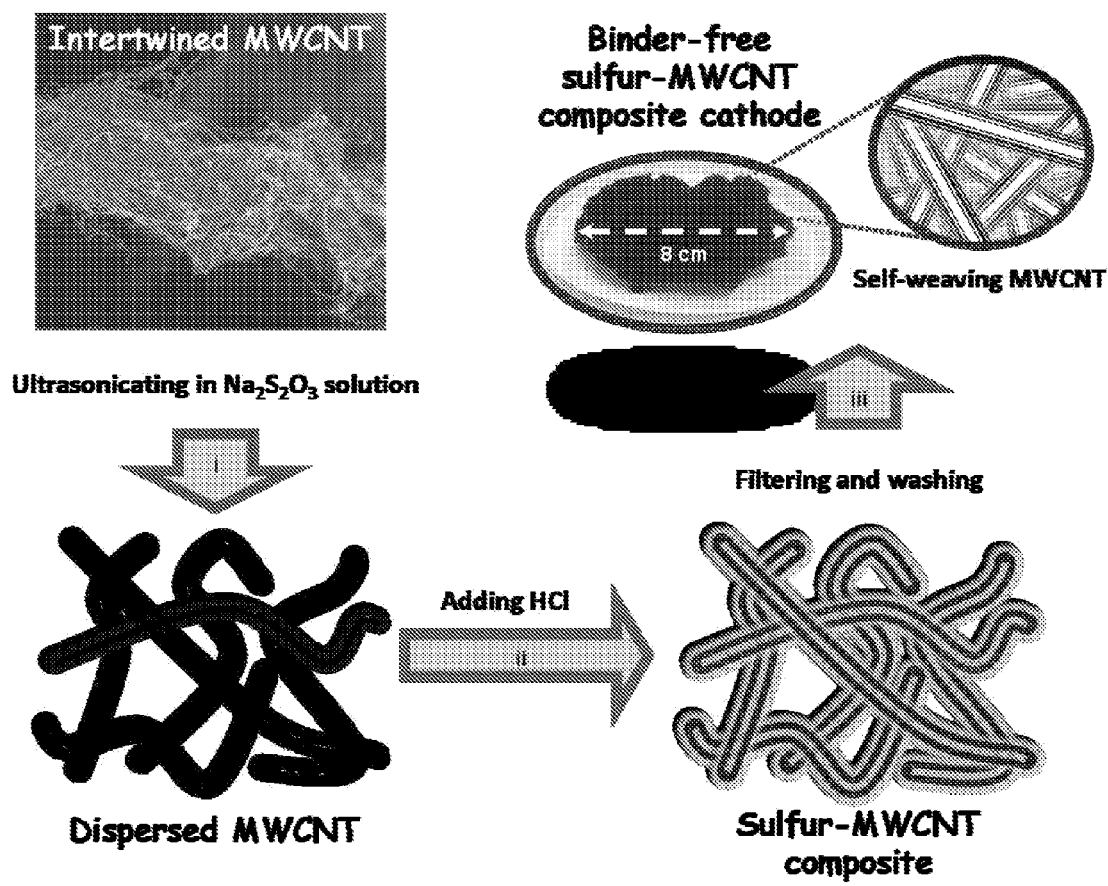
FIG. 1 illustrates one embodiment of a synthesis process for a sulfur-carbon nanotube (S—CNT) composite cathode.

The current disclosure relates to a binder-free sulfur-carbon nanotube (S—CNT) composite for use as a cathode in a lithium-sulfur (Li—S) battery. It also relates to methods of making such a composite and to cathodes and batteries containing such a material.

Method of Forming Binder-Free Sulfur-Carbon Nanotube Composite

According to one embodiment, the disclosure provides a method of forming a binder-free S—CNT composite by in-situ sulfur deposition. In some embodiments, an aqueous solution of sulfur-based ions from a sulfur source and carbon nanotubes may be formed. In certain embodiments, the solution may serve to facilitate the formation of sulfur-based ions from the sulfur source and to allow dispersion of the sulfur-based ions and carbon nanotubes to facilitate the reaction of the sulfur-based ions with an acid and to facilitate nucleation of sulfur on carbon. The aqueous solution of sulfur-based ions and carbon thus formed may be a dilute aqueous solution. A wetting agent may be added to facilitate the dispersal of the nanotubes throughout the solution.

In some embodiments, carbon nanotubes may be multi-wall carbon nanotubes (MWCNT), or any other variety of carbon nanotubes that are able to intermingle such that they may form a solid sheet and have sulfur deposited thereon. Formation of a solid sheet may occur due to a self-weaving behavior, due to tangling of distinct molecules, due to creation of large macromolecules, or any other method causing the nanotubes to form a solid sheet. Nanotubes used in various embodiments may be any single-wall carbon nanotubes, double-wall carbon nanotubes, and multi-wall carbon nanotubes or combinations thereof able to self-weave into a sheet in the category of carbon nanotubes. The sulfur source may be a metal thiosulfate ($M_xS_2O_3$) such as sodium thiosulfate ($Na_2S_2O_3$) or potassium thiosulfate ($K_2S_2O_3$), or any other compounds with a thiosulfate ion or other sulfur-based ions. The wetting agent may comprise isopropyl alcohol, acetone, ethanol, or any other organic solvent able to reduce the hydrophobicity of the carbon nanotubes. The acid may be hydrochloric acid, or any other $H^+$ source able to facilitate the precipitation of sulfur by providing $H^+$ either directly or indirectly to the sulfur-based ions.

The reaction mixture may be stirred for a duration of time, in some embodiments, the reaction may be mixed for 24 hours. In some embodiments, this duration may be shorter or longer by adjusting the concentration of reagents. In some embodiments, the reaction may proceed at any temperature below 120° C., the melting point of sulfur. In some embodiments, this may be at room temperature.

Once the nucleation has proceeded sufficiently, the S—CNT may be precipitated out and washed, filtered, and dried. Sufficiency of nucleation may be determined by the ability of the nanotubes, when formed into a sheet, to function as a cathode material for a battery because of the sulfur deposited thereon. In some embodiments, the filtration may comprise vacuum filtration, or any other filtration sufficient to remove excess aqueous solvent from the S—CNT. In some embodiments, the washing may comprise washing by acetone, deionized water, ethanol, or any other solvent that will not dissolve the S—CNT, or any combination thereof. In certain embodiments, the formation of a sheet of carbon nanotubes occurs as the aqueous solution is filtered, washed and dried. This may occur as the carbon nanotubes intermingle and come into closer proximity as solvent is removed. The drying may occur for 24 h in an air-oven at 50° C. In some embodiments substantially all of the water is removed from the S—CNT composite by washing and drying. In particular, sufficient water may be removed to allow safe use of the sulfur-carbon composite with a Li anode, which may react with water, causing damage to the battery or even an explosion if too much residual water is present.

In some embodiments, synthesizing an S—CNT composite may include ultrasonicating intertwining MWCNT bundles in a dilute aqueous solution of sodium thiosulfate to separate the MWCNTs individually from the twisted cluster. This may be followed by depositing sulfur onto the MWCNTs with the addition of hydrochloric acid. The sulfur may tend to deposit onto the MWCNTs rather than nucleating by itself due to the low activation energy of heterogeneous nucleation. After allowing the deposition reaction to proceed for 24 hours, the sulfur-CNT (S—CNT) composite thus obtained may be vacuum-filtered and washed 3 times each with deionized water, ethanol, and acetone. During the filtration process, a uniform and flexible S—CNT composite film may be formed because of its self-weaving behavior. In some embodiments, it may be easily peeled off from the filter membrane after drying.

This method provides several improvements over other conventional methods used to create a carbon and sulfur based cathode. For example, the synthesis may take place in an aqueous solution. This allows for the use of less toxic or less caustic reagents. This also creates a synthesis pathway that is easier to achieve and easier to scale up. The S—CNT composite obtained has a generally uniform distribution of sulfur and carbon. In addition, the S—CNT composite is pure, with a majority of undesired components being removed from the sulfur-carbon composite during the synthesis process. Purity of the compound may be assessed, for example, by X-ray diffraction, in which any impurities show up as additional peaks. Further, the synthesis process of the present disclosure does not require a subsequent heat treatment or purification process. This decreases time and energy requirements over other conventional methods, allowing for a lower cost method for creation of sulfur-based battery materials.

In addition, this fabrication process of S—CNT composite may be tunable and scalable for improved synthesis and manufacture of Li—S cathodes. This improved synthesis process allows the creation of a S—CNT composite without using toxic N-Methyl-2-pyrrolidone (NMP). This provides environmental benefits, as well as improved processing safety for individuals working with the synthesis or manufacturing process.

Sulfur-Carbon Nanotube Composite

According to another embodiment, the disclosure also includes sulfur-carbon nanotube composite including a sheet assembled from carbon nanotubes with sulfur deposited thereon. This sulfur-carbon nanotube composite may be used in a cathode as the active material. The sulfur and carbon nanotubes in the composite may be chemically bonded to one another at an interface, with sulfur not located at the interface not chemically bonded to the carbon nanotubes. Alternatively, the sulfur and carbon nanotubes may be physically attached, but not chemically bonded to one another, for example by Van der Waal's forces. The sulfur-carbon nanotube composite may be formed by following the method described above.

In some embodiments, the S—CNT composite may comprise a self-woven solid sheet of individual carbon nanotubes. In some embodiments, these carbon nanotubes may form a loose network. In some embodiments, the carbon nanotube sheet may be electrically conductive. In some embodiments, the carbon nanotube sheet may be configured such that it allows elemental sulfur deposited upon the carbon nanotube sheet to reversibly react to form polysulfides. In some embodiments, the carbon nanotube sheet may substantially prevent the polysulfides from migrating away from the carbon nanotube sheet. This may be caused by the degree of intermingling of the carbon nanotubes, or it may be caused by the proximity of the carbon nanotubes to each other within the sheet. In some embodiments, the carbon nanotube sheet is further configured to allow lithium, either in elemental or ionic form, to travel proximate to the sulfur deposited upon the carbon nanotubes. In some embodiments, this may allow the lithium to react with the sulfur. In other embodiments, the S—CNT composite may be configured to adsorb a certain volume of electrolyte. In some embodiments, this may include up to 40 μL/cm$^2$.

Cathodes and Batteries

The disclosure also includes cathodes made using a sulfur-carbon composite as described above as the active material. Due to the presence of a sheet of conductive carbon nanotubes, there may be no need for a traditional current collector, such as a metal backing for the cathode. However, a metal backing or other current collector may be provided in some embodiments to further enhance conductivity of the cathode or to provide structural support. Non-conductive backings may also be used to provide structural support.

Cathodes of the current disclosure may also differ from traditional cathodes in that a binder may not be needed to secure the sulfur to the carbon nanotubes. Accordingly, the cathode may be binder-free. The cathode may also not need other traditional cathode components, such as additional conductive carbon mixed with the sulfur.

Various dimensions and thicknesses of electrodes may be synthesized depending upon the need of battery design. In one embodiment, the electrode may have a thickness on a micrometer scale. For instance, it may be around 50 microns.

In another embodiment, the disclosure relates to a battery containing a cathode including an active material as described above. The cathode may be of a type described above. The battery may further contain an anode and an electrolyte to complete the basic components of an electrochemical cell. The anode and electrolyte may be of any sort able to form a functional rechargeable battery with the selected cathode material. In one embodiment, the anode may be a lithium metal (Li or Li$^0$ anode). In some embodiments, the electrolyte may comprise a solution of DOL/DME, v/v=1. In some embodiments, a battery may further contain separators and spacers. In some embodiments a separator may comprise a Celgard polypropylene separator. In some embodiments, a spacer may comprise a nickel foam spacer.

The battery may further contain contacts, a casing, or wiring. In the case of more sophisticated batteries it may contain more complex components, such as safety devices to prevent hazards if the battery overheats, ruptures, or short circuits. Particularly complex batteries may also contain electronics, storage media, processors, software encoded on computer readable media, and other complex regulatory components.

Batteries may be in traditional forms, such as coin cells or jelly rolls, or in more complex forms such as prismatic cells. Batteries may contain more than one electrochemical cell and may contain components to connect or regulate these multiple electrochemical cells. S—CNT composites of the present disclosure may be adapted to any standard manufacturing process and battery configurations.

Batteries of the present disclosure may include improved electrical properties over traditional Li—S batteries. In some embodiments, batteries of the present disclosure may have improved electrochemical stability. In some embodiments, this may include no significant change in voltage or current density after 10 cycles. In some embodiments, batteries of the present disclosure may exhibit self-improving attributes during cycling. In some embodiments, batteries of the present disclosure may include decreased charge transfer resistance during cycling compared to prior art cathodes. In some embodiments, charge transfer resistance prior to cycling may be about 46 ohms, and stay below 25 ohms even after 50 cycles.

In some embodiments, batteries of the present disclosure exhibit fast charging times. For example, in some embodiments, a 2C theoretical rate for a sulfur battery may equate to 30 minutes of charge time, and actual charge times may take 17.6 or 10.9 minutes. In some embodiments, a battery employing an S45-CNT cathode may charge in 17.6 minutes. In other embodiments, a battery employing an S60-CNT cathode may charge in 10.9 minutes. In some embodiments, the cycling capabilities may be manipulated by altering the sulfur/CNT ratio. In some embodiments, a higher sulfur/CNT ratio may correspond to less interfacial contact between sulfur and CNTs. In some embodiments, after 50 cycles of charge/discharge a battery of the present disclosure may maintain a generally uniform distribution of sulfur and carbon throughout the cathode.

Batteries of the present disclosure may be used in a variety of applications. They may be in the form of standard battery size formats usable by a consumer interchangeably in a variety of devices. They may be in power packs, for instance for tools and appliances. They may be usable in consumer electronics including cameras, cell phones, gaming devices, or laptop computers. They may also be usable in much larger devices, such as electric automobiles, motorcycles, buses, delivery trucks, trains, or boats. Furthermore, batteries according to the present disclosure may have industrial uses, such as energy storage in connection with energy production, for instance in a smart grid, or in energy storage for factories or health care facilities, for example in the place of generators.

Batteries of the present disclosure may exhibit several improvements over prior art batteries. For example, as the batteries use lithium and carbon, these materials are relatively inexpensive and environmentally friendly. Further, as described above, the synthesis used eliminates other harmful reagents in the fabrication process. In addition to being a low-cost, environmentally benign fabrication process, the elimination of current collectors reduces the net weight of the electrodes and increases the energy density of the battery. This also eliminates the cost associated with including these components.

EXAMPLES

The following examples are provided to further illustrate specific embodiments of the disclosure. They are not intended to disclose or describe each and every aspect of the disclosure in complete detail and should be not be so interpreted.

Example 1

Formation of Sulfur-Carbon Nanotube Composite

Sulfur-carbon nanotube composites used in Examples 2-5 herein were prepared as described in this Example 1.

FIG. 1 illustrates one embodiment of a synthesis process for a S—CNT composite. To synthesize the S—CNT composite, 75 mg of MWCNTs were dispersed in 1 L of 0.03 M $Na_2S_2O_3$ solution by high-power ultrasonication for 15 minutes with the addition of 20 mL of isopropyl alcohol to mitigate the hydrophobic behavior of the MWCNTs. The mixture was then split equally into dispersions 1 and 2, followed by the addition of 0.75 and 1.35 mL of HCl, respectively, into dispersions 1 and 2 and stirring strongly for 24 h at room temperature to synthesize the two composites with 45 wt. % sulfur (denoted as S45-CNT) and 60 wt. % sulfur (denoted as S60-CNT). The products were vacuum-filtered and washed three times each with deionized water, ethanol, and acetone. The binder-free sulfur-MWCNT composite cathodes thus formed were a flexible film with a diameter of 8 cm after drying for 24 h at 50° C. in an air-oven, which could be readily peeled off the filter membrane.

Example 2

Characterization and Morphology of S—CNT Composite

One of the S—CNT composites of Example 1 (S45-CNT) was characterized using thermogravimetric analysis (TGA) and X-ray diffraction (XRD); morphology was examined using a scanning transmission electron microscope (STEM). For comparison sake, XRD was also performed for pristine MWCNTs. The TGA was performed with a Perkin-Elmer TGA 7 Thermogravimetric Analyzer from 30 to 300° C. in flowing air at a heating rate of 5° C./min. XRD patterns were recorded with a Philips X-ray Diffractometer (PW 1830+ APD 3520) with Cu Kα radiation from 10° to 70° at a scan rate of 0.02°/s. A Hitachi S-5500 scanning electron microscope (SEM) equipped with a scanning transmission electron microscope (STEM) and a FEI Quanta 650 SEM was used for the SEM and STEM images.

Figure 2:
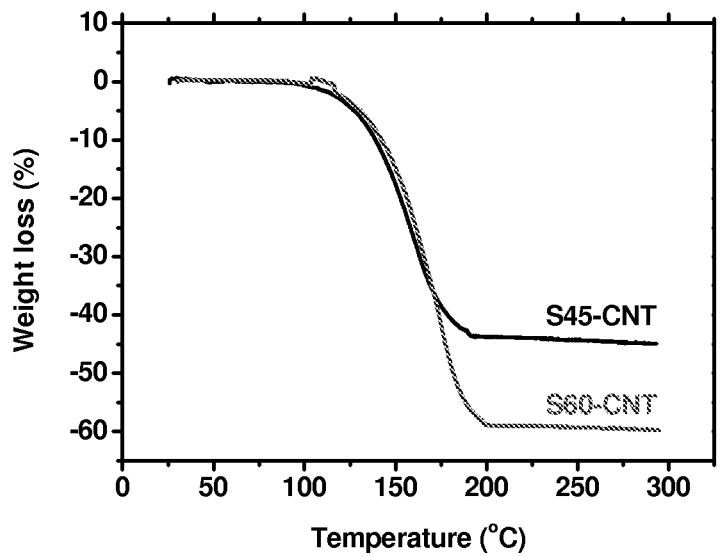
FIG. 2 provides thermogravimetric analysis (TGA) of S—CNT composites in flowing air from 30 to 300° C. with a heating rate of 5° C./min.

As shown in FIG. 2, TGA for S45-CNT and for S60-CNT is provided. FIG. 2 illustrates that the S45-CNT composite had 45% sulfur and the S60-CNT composite had 60% sulfur.

Figure 3:
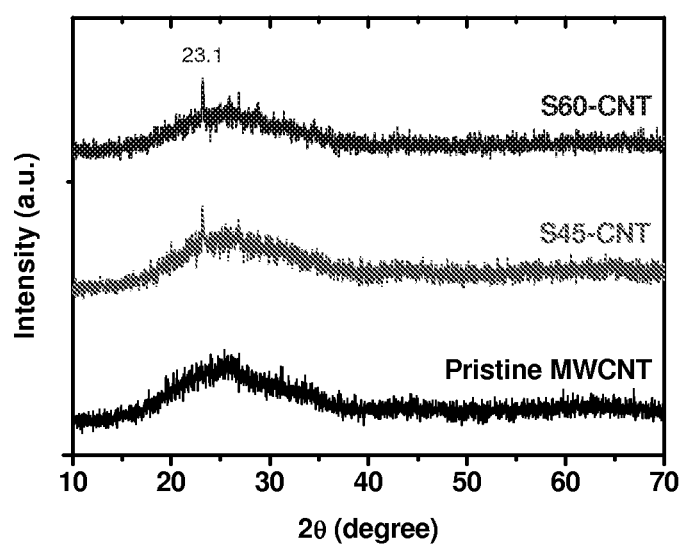
FIG. 3 provides XRD patterns of pristine multi-wall carbon nanotubes (MWCNT) and binder-free S—CNT composites (S45-CNT and S60-CNT). XRD patterns were recorded with Cu Kα radiation from 10° to 70° at a scan rate of 0.02°/s.

As shown in FIG. 3, the XRD pattern of the pristine MWCNTs indicates an amorphous structure without any sharp peaks, while those of the S45-CNT and S60-CNT samples show only a tiny main peak at 2θ=23.1° corresponding to elemental sulfur $S_8$, indicating the nanocrystalline or amorphous nature of the deposited sulfur.

Figure 4:
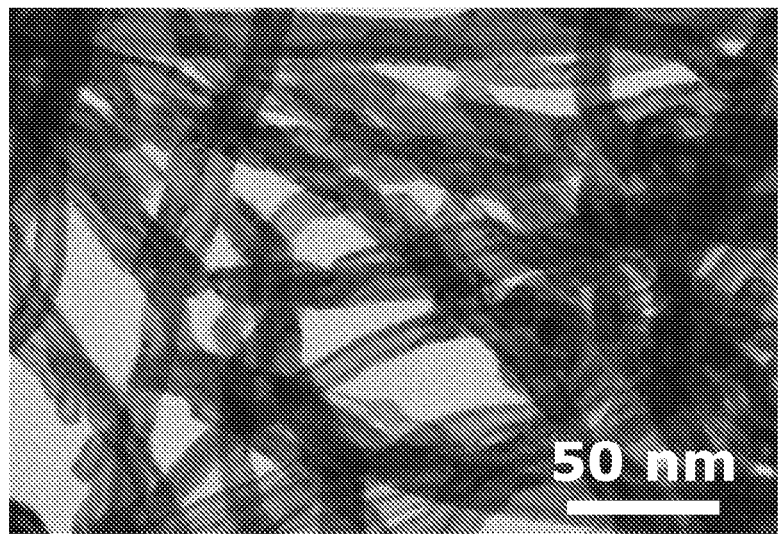
FIG. 4 provides a scanning transmission electron microscopy (STEM) image of a S—CNT composite. The bar is 50 nm FIG. 5 provides a scanning electron microscope (SEM) image of a S—CNT composite. The bar is 250 nm.
Figure 5:
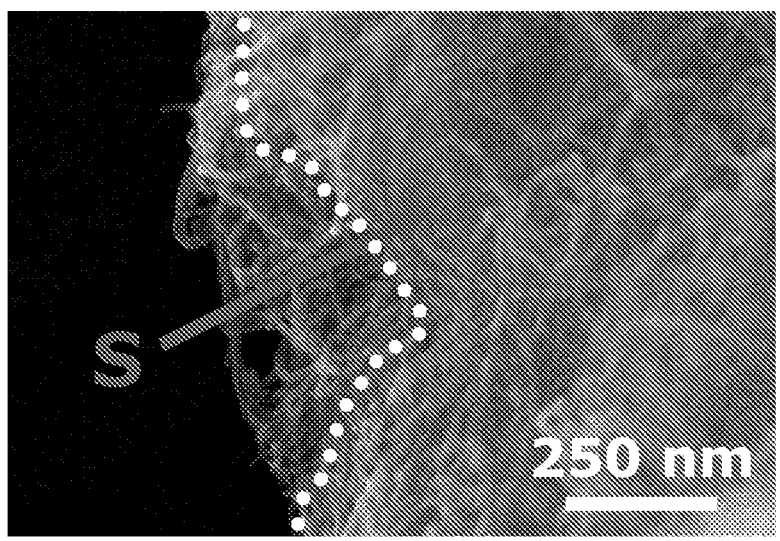

FIG. 4 shows an STEM image of the S—CNT composite. The MWCNTs have a tortuous shape as seen in FIG. 4, which is beneficial for self-weaving and fabricating a binder-free film. The scanning electron microscope (SEM) image of the edge of the S—CNT composite is shown in FIG. 5, in which sulfur can be observed as a cloudy substance covering the entire framework built by the MWCNTs, i.e., the carbon nanotubes are embed in sulfur, forming an inseparable complex. The conductive MWCNTs act as a structural skeleton and support the integrity of the composite.

In addition, the S—CNT composite was examined for ability to adsorb electrolyte. The electrolyte adsorption ability of the cathode material was estimated by soaking the composite in an electrolyte solvent (1,2-Dimethoxyethane (DME) and 1,3-Dioxolane (DOL) (1:1, v/v)), removing it, and measuring the decrease in the volume of the electrolyte. The interwoven structure of the composite could adsorb 36.3 μL/cm² of electrolyte, preserving the electrolyte and active material within the MWCNT matrix.

Example 3

Battery using S—CNT Composite

Batteries prepared according to the present Example 3 were used in Examples 4-5 herein.

The S45-CNT and S60-CNT films of Example 1 were used directly as cathodes. A 1.85 M $LiCF_3SO_3$ solution was prepared with a mixture of 1,2-Dimethoxyethane (DME) and 1,3-Dioxolane (DOL) (1:1, v/v) as the electrolyte for cycling tests. CR2032 coin cells were assembled with binder-free S—CNT composite cathodes, the prepared electrolyte, Celgard polypropylene separators, lithium metal anodes, and nickel foam spacers in a glove box filled with argon.

Example 4

Cyclic Voltammetry of S—CNT Composite Cathode

Cyclic voltammetry (CV) of S—CNT composite batteries of Example 3 were performed. The discharge/charge profiles and cycle data were obtained with an Arbin battery cycler. The C rates specified are based on the theoretical capacity of sulfur (1675 mA $g^{-1}$). The CV data were collected with a VoltaLab PGZ 402 Potentiostat at a scan rate of 0.2 mV/s in the potential range of 2.8-1.5 V.

Figure 6:
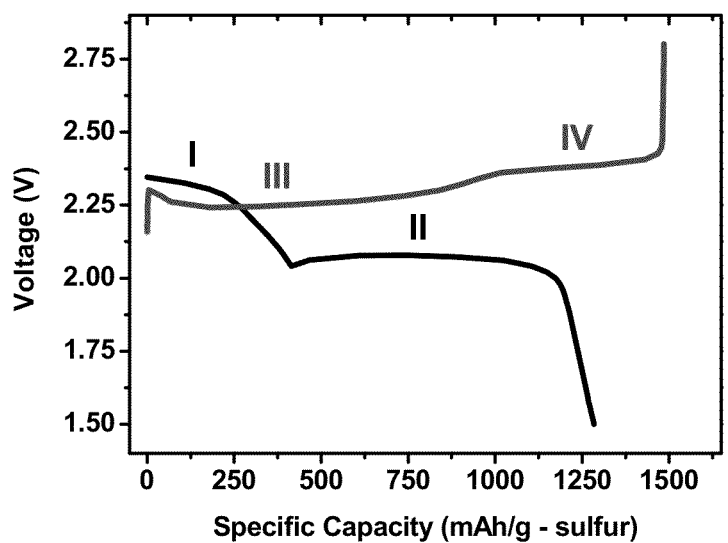
FIG. 6 provides discharge/charge profile of a S45-CNT cathode at C/2 rate. The C rate is based on the theoretical capacity of sulfur (1675 mA $g^{-1}$).

As shown in FIG. 6, there are two typical plateaus in both the discharge (plateaus I and II) and charge (plateaus III and IV) profiles of the S—CNT composite cathode. The first discharge plateau I from 2.35 to 2.05 V is attributed to the reduction of elemental sulfur to the soluble lithium polysulfides as shown in reaction 1 below:

$$4 Li^+ + 4 e^- + S_8 \rightarrow 2 Li_2S_4 \qquad (1)$$

This is a half-electron charge transfer per sulfur atom, contributing about 25% of the total specific capacity. The second discharge plateau II at about 2.05 V is due to the further reduction of lithium polysulfides to $Li_2S_2$ and subsequently to $Li_2S$ as shown in reaction 2 below:

$$6 Li^+ + 6 e^- + Li_2S_4 \rightarrow 4 Li_2S \qquad (2)$$

Figure 7:
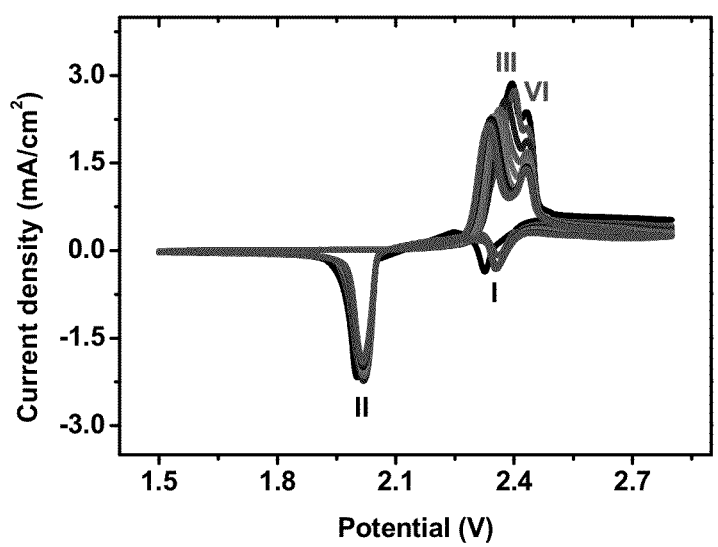
FIG. 7 provides cyclic voltammetry (CV) plots of a S45-CNT cathode at a scan rate of 0.2 mV/s between 2.8 and 1.5 V during the first 10 cycles, at a rate of C/2. The C rate is based on the theoretical capacity of sulfur (1675 mA $g^{-1}$).

This accounts for a one and a half electron charge transfer per sulfur, contributing the remaining 75% of the specific capacity. The first charge plateau III between 2.25 and 2.35 V represents the oxidation reaction from the solid $Li_2S$ and $Li_2S_2$ phase to $Li_2S_n$ (n>2), and the second charge plateau IV represents the final oxidation of the polysulfides to sulfur. As shown in FIG. 7, the two cathodic (I, II) and anodic (III, IV) peaks in the cyclic voltammogram (CV) resemble the two discharge (I, II) and charge (III, IV) plateaus of FIG. 6. The CV profiles for the first 10 cycles have no significant change in the voltage or current, showing the excellent electrochemical stability of the S—CNT composite cathode.

Figure 8:
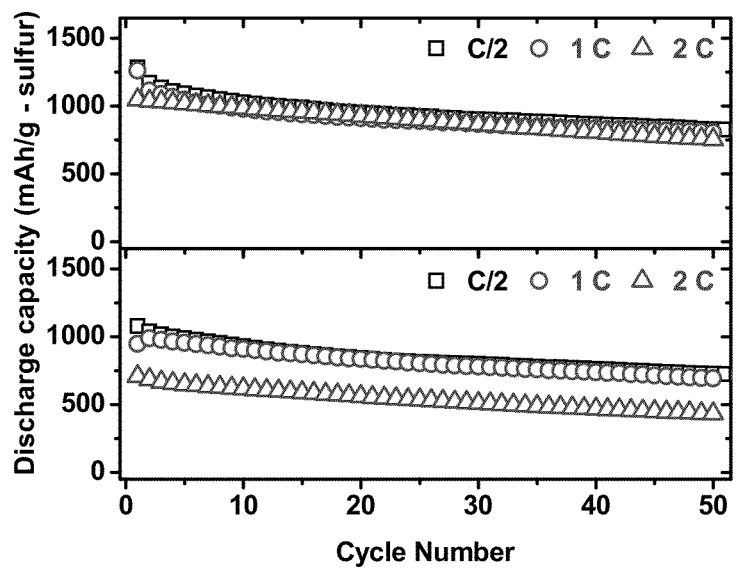
FIG. 8 provides cyclability profiles of S45-CNT and S60-CNT cathodes at a rate of C/2, 1C, and 2C. The discharge/charge profiles and cycle data were obtained with an Arbin battery cycler. The C rates are based on the theoretical capacity of sulfur (1675 mA $g^{-1}$).

The cyclability profiles of the S45-CNT and S60-CNT cathodes are shown in FIG. 8. The S45-CNT and S60-CNT cathodes exhibit first discharge capacities of, respectively, 1285 and 1079 mAh $g^{-1}$ at C/2 rate. The lower capacity of the S60-CNT cathode with a higher sulfur/MWCNTs ratio is ascribed to less interfacial contact between sulfur and MWCNTs. After 50 cycles, the S45-CNT and S60-CNT cathodes maintain reversible capacities of, respectively, 829 and 727 mAh $g^{-1}$. Even at a high rate of 2C, the S45-CNT cathode shows an excellent initial capacity of 1046 mAh $g^{-1}$ and a reversible capacity of 755 mAh $g^{-1}$ after 50 cycles. While the cyclability plots of S45-CNT at all the three C rates employed (C/2, 1C, and 2C) overlap, the cyclability plot of S60-CNT displays a slightly lower capacity at 2C rate due to the utilization of less active materials at higher reaction rates. Although the 2C rate translates to a full discharge or charge in 30 minutes, the actual average charge times for S45-CNT and S60-CNT are only, respectively, 17.6 and 10.9 minutes, demonstrating an impressive potential for ultra-fast charging.

Figure 9:
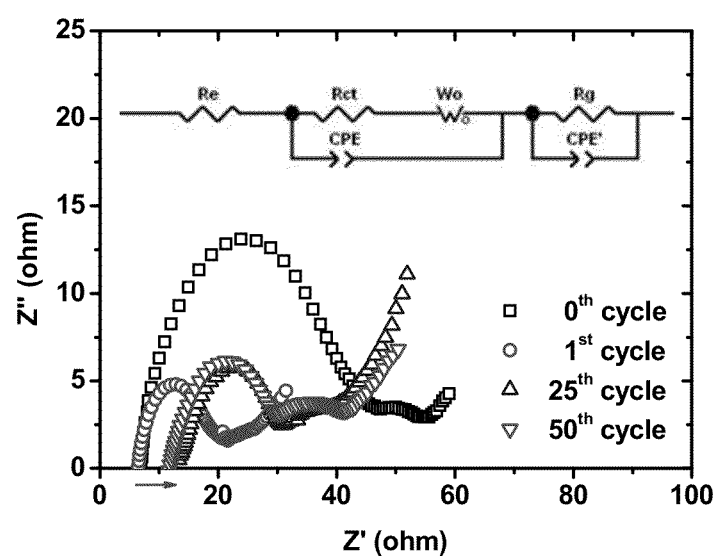
FIG. 9 provides Nyquist plots and an equivalent circuit of a battery using a S45-CNT cathode, measured before cycling and after the $1^{st}$, $25^{th}$, and $50^{th}$ cycles at C/2 rate. Electrochemical impedance spectroscopy (EIS) data were collected from 1 MHz to 100 mHz with an AC voltage amplitude of 5 mV at the open-circuit voltage of the coin cells.

Nyquist plots and an equivalent circuit of the cell with the S45-CNT cathode, measured before cycling and after the $1^{st}$, $25^{th}$, and $50^{th}$ cycles at C/2 rate are shown in FIG. 9. The charge transfer resistance $R_{ct}$ at the interface between sulfur and MWCNTs is calculated from the diameter of the semicircle, which is reduced significantly after the first cycle. Electrochemical impedance spectroscopy (EIS) measurements were performed to assess the internal impedance during cycling. EIS data were collected with a Solartron Impedance Analyzer (SI 1260+SI 1287) from 1 MHz to 100 mHz with an AC voltage amplitude of 5 mV at the open-circuit voltage of the coin cells.

With reference to FIG. 9, $R_e$, calculated from the intersection of the initial part of the semicircle with the Z' axis in the high frequency region, relates to the impedance from the electrolyte. $R_{ct}$, calculated from the diameter of the semicircle, refers to the charge transfer resistance at the interface between the conductive agent and sulfur. $W_o$ is the Warburg impedance, which relates to the diffusion of polysulfides in the electrode. CPE is the constant phase element about the double-layer capacitance. $R_g$ results from the resistance to lithium-ion diffusion through the MWCNT framework, and CPE' relates to the space charge capacitance. The $R_e$ values before ($R_{e,\,0th}$=6.9 ohm) and after ($R_{e,\,1st}$=6.5 ohm) the first cycle are smaller than those after the $25^{th}$ ($R_{e,\,25th}$=12.7 ohm) and $50^{th}$ cycles ($R_{e,\,50th}$=11.8 ohm). The electrolyte employed has the unique property of turning into a gel-like behavior after resting for a few hours. The increase in electrolyte resistance after many cycles can be attributed to the increasing viscosity of the electrolyte, resulting in a decrease in the mobility of lithium and polysulfide ions through the electrolyte. The $R_{ct}$ value before cycling is 45.9 ohm. After the $1^{st}$ cycle, the charge transfer resistance decreases by 65% ($R_{ct,\,1st}$=16.3 ohm) and remains quite low even after the $25^{th}$ ($R_{ct,\,25th}$=21.7 ohm) and $50^{th}$ cycles ($R_{ct,\,50th}$=22.6 ohm). The decrease in charge transfer resistance implies that the S—CNT composite cathodes may be self-improved during cycling, maintaining high electrical and ionic conductivity and confining the active material within the electrode.

Example 5

Microstructure and Elemental Mapping of S—CNT Composite Cathodes Under Cycling

The microstructure and elemental map of a S—CNT composite cathode (S45-CNT) was observed before and after cycling. A Hitachi S-5500 scanning electron microscope (SEM) equipped with a scanning transmission electron microscope (STEM) and a FEI Quanta 650 SEM were used for the SEM images. The elemental mapping results were performed with an energy dispersive spectrometer (EDS) attached to the FEI Quanta 650 SEM.

Figure 10:
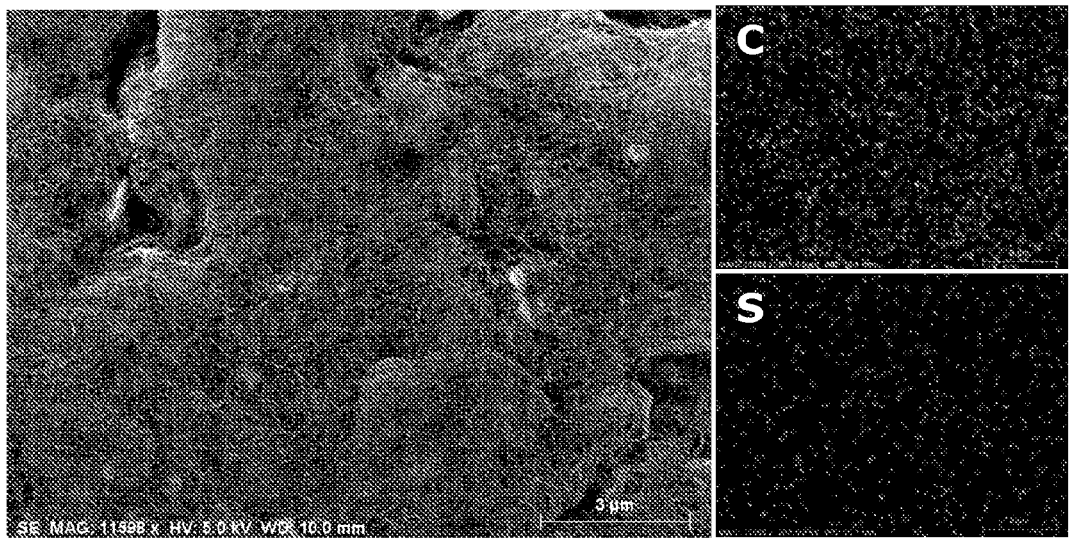
FIG. 10 provides an SEM image and elemental mapping of a S—CNT composite before cycling. On the left is an SEM image of the S—CNT composite. On the top right is elemental mapping for carbon. On the bottom right is elemental mapping for sulfur. The bar is 3 micrometers.
Figure 11:
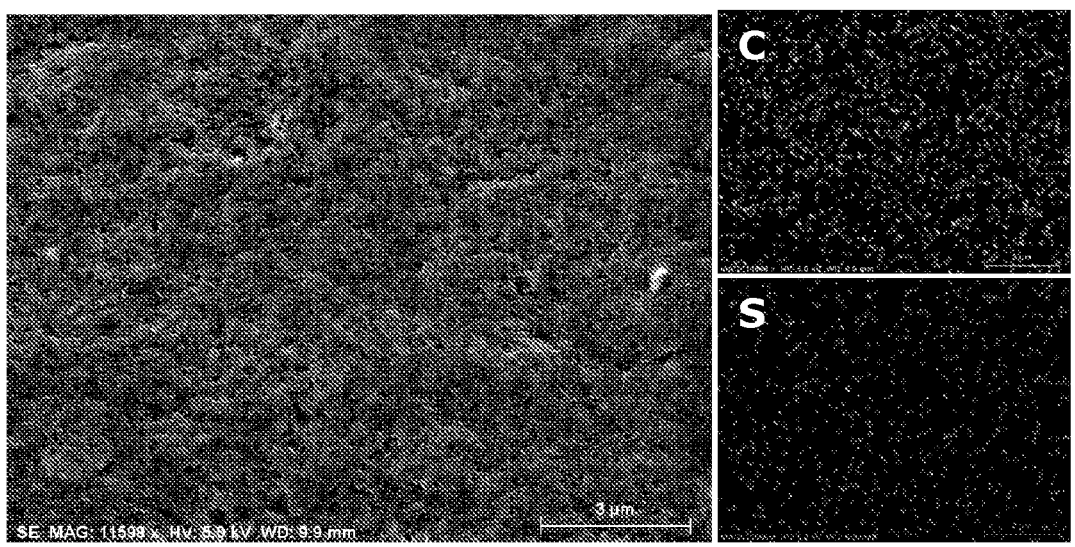
FIG. 11 provides a SEM image and elemental mapping of a S—CNT composite after 50 cycles at a rate of C/2. On the left is an SEM image of the S—CNT composite. On the top right is elemental mapping for carbon. On the bottom right is elemental mapping for sulfur. The bar is 3 micrometers.

FIG. 10 provides an SEM image and elemental mapping of the S45-CNT composite cathode before cycling. FIG. 11 provides an SEM image and elemental mapping of the S45-CNT composite cathode after 50 cycles at a rate of C/2. As shown in FIG. 10, the SEM image reveals the interwoven structure of MWCNTs clearly before cycling. As shown in FIG. 11, after 50 cycles the composite cathode becomes dense, but the MWCNTs still resemble a network grid to contain the active material within the electrode. With excellent mechanical strength, the flexible MWCNT framework is able to endure the volume expansion of the active material during cycling. The dense electrode structure provides a better contact of the insulating active material with the conductive MWCNTs, which facilitates fast charge transfer during the electrochemical reaction and is consistent with the EIS results of Example 4. The elemental mapping results of FIGS. 10 and 11 indicate that both sulfur and carbon are uniformly distributed throughout the cathode structure not only before cycling but also after 50 reversible reduction/oxidation reactions. The binder-free S45-CNT composite cathodes maintain a well-distributed morphology and retain sufficient reaction sites for electrochemical reactions, leading to excellent high-rate cycle performance.

Although only exemplary embodiments of the disclosure are specifically described above, it will be appreciated that modifications and variations of these examples are possible without departing from the spirit and intended scope of the disclosure. For instance, numeric values expressed herein will be understood to include minor variations and thus embodiments "about" or "approximately" the expressed numeric value unless context, such as reporting as experimental data, makes clear that the number is intended to be a precise amount.

The invention claimed is:

1. A sulfur-carbon nanotube composite comprising:
   a sheet of self-assembled, interwoven, multi-walled carbon nanotubes;
   sulfur nucleated upon the carbon nanotubes in an amount of at least 45 weight % of the composite and configured to reversibly react with an alkali metal to form polysulfides.

2. The sulfur-carbon nanotube composite of claim 1, wherein the sheet of carbon nanotubes is configured to substantially prevent the dispersal of polysulfides away from the sheet.

3. A cathode comprising:
   a sheet of self-assembled interwoven, multi-walled carbon nanotubes; and
   sulfur nucleated upon the carbon nanotubes nanotubes in an amount of at least 45 weight % of the combination of carbon-nanotubes and sulfur and configured to reversibly react with an alkali metal to form polysulfides,
   wherein the cathode is substantially free of any binder.

4. The cathode of claim 3, wherein the cathode does not comprise a current collector.

5. The cathode of claim 3, wherein the sheet of carbon nanotubes is configured to substantially prevent the dispersal of polysulfides away from the sheet.

6. The cathode of claim 3, wherein the sulfur nucleated upon the carbon nanotubes is present in an amount of at least 60 weight % of the combination of carbon-nanotubes and sulfur.

7. A battery comprising:
   a cathode comprising:
      a sheet of self-assembled interwoven, multi-walled carbon nanotubes; and
      sulfur nucleated upon the carbon nanotubes in an amount of at least 45 weight % of the combination of carbon-nanotubes and sulfur and configured to reversibly react with an alkali metal to form polysulfides;
   an anode comprising an alkali metal;
   an electrolyte.

8. The battery of claim 7, wherein the battery is chargeable in less than ⅔ the theoretical charge time.

9. The battery of claim 7, wherein the cathode does not comprise a current collector.

10. The battery of claim 7, wherein the sheet of carbon nanotubes is configured to substantially prevent the dispersal of polysulfides away from the sheet.

11. The battery of claim 7, wherein the sulfur nucleated upon the carbon nanotubes is present in an amount of at least 60 weight % of the combination of carbon-nanotubes and sulfur.

* * * * *